D. FERGUSSON & J. R. WAY.
VENTILATOR FOR VEHICLES.
APPLICATION FILED SEPT. 23, 1911.
1,078,340.
Patented Nov. 11, 1913.
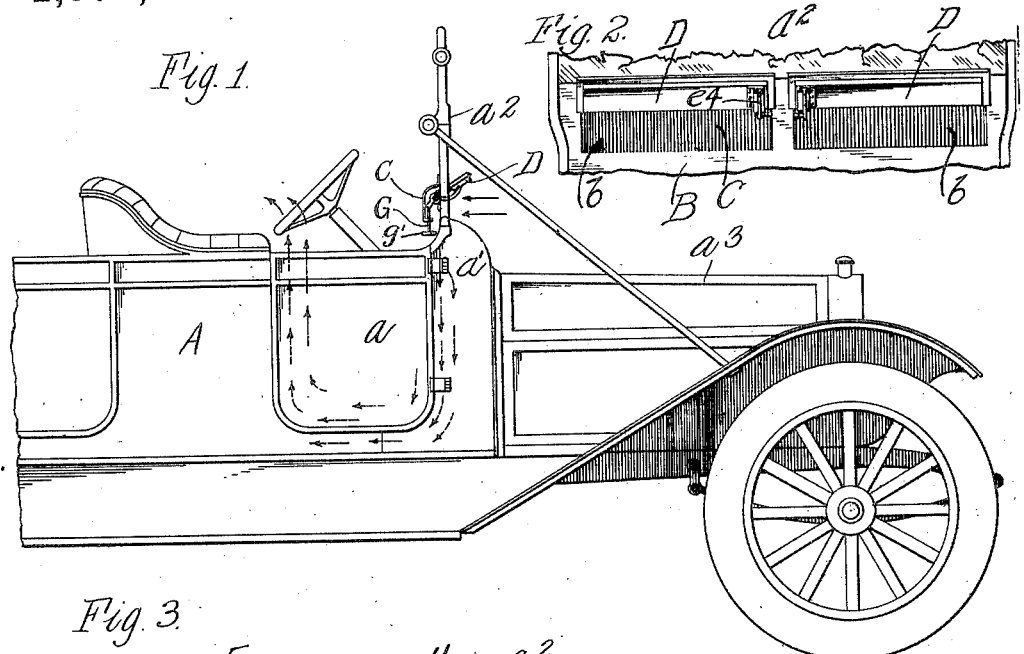
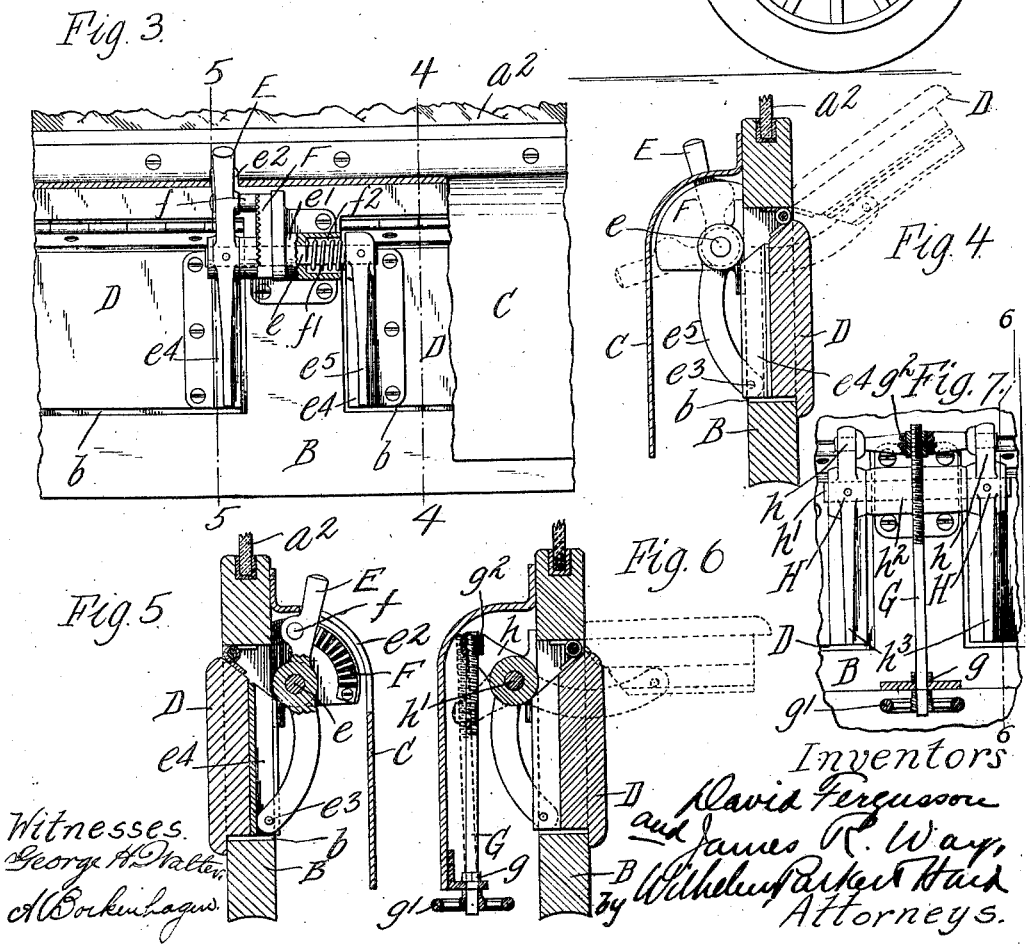
Witnesses
George H. Walter
A. Bockenhagen
Inventors
David Fergusson
and James R. Way,
by Wilhelm Parker Ward
Attorneys.

UNITED STATES PATENT OFFICE.

DAVID FERGUSSON AND JAMES R. WAY, OF BUFFALO, NEW YORK, ASSIGNORS TO THE PIERCE-ARROW MOTOR CAR COMPANY, OF BUFFALO, NEW YORK.

VENTILATOR FOR VEHICLES.

1,078,340.

Specification of Letters Patent.

Patented Nov. 11, 1913.

Application filed September 23, 1911. Serial No. 650,864.

*To all whom it may concern:*

Be it known that we, DAVID FERGUSSON, a subject of the King of Great Britain, and JAMES R. WAY, a citizen of the United States, both residing at Buffalo, in the county of Erie and State of New York, have invented a new and useful Improvement in Ventilators for Vehicles, of which the following is a specification.

This invention relates to ventilators for use on motor driven vehicles or automobiles which have partly inclosed portions within which it is desired to produce a circulation of air.

In automobile bodies of the fore door type, in which the foot space for the front seat is inclosed at opposite sides by the fore doors, the heat from the engine frequently causes discomfort to the occupants of the front seat.

The objects of this invention are to provide an efficient and desirable ventilator for the inclosed foot space which, during the movement of the car, will direct a current of air through the inclosed space and thereby dissipate the heat and overcome the objection to this type of automobile body; also to produce a ventilator of this kind which is adjustable to regulate the ventilation as desired, is inconspicuous and neat in appearance and is so arranged on the vehicle as to afford ample ventilation and be easily accessible for adjustment.

In the accompanying drawings: Figure 1 is a fragmentary side view of an automobile provided with a ventilator embodying the invention. Fig. 2 is a front elevation, on a larger scale, of the ventilator. Fig. 3 is a fragmentary rear elevation, on an enlarged scale, of the ventilator, the deflector being partly broken away to disclose the operating mechanism. Figs. 4 and 5 are vertical sectional elevations on lines 4—4 and 5—5, respectively, Fig. 3. Fig. 6 is a vertical sectional elevation on line 6—6, Fig. 7, showing different means for operating the shutters. Fig. 7 is a rear elevation thereof.

Like reference characters refer to like parts in the several figures.

A represents an automobile body, provided with fore doors $a$ which close the opposite sides of the foot space for the front seat, $a'$ the dash, and $a^2$ a transparent wind shield which is mounted on and rises above the dash. These parts may be of any usual or suitable construction.

The ventilator is preferably located above the top of the hood $a^3$, which projects forwardly from the dash and incloses the engine, and below the transparent pane or panes of the wind shield, and may form either a part of the wind shield or of the dash, or may be formed in a separate member arranged between these two parts. It preferably forms part of the detachable wind shield. The ventilator is so constructed and arranged that during the forward motion of the vehicle, air will pass through the ventilator openings and be deflected downwardly in rear of the dash into the foot space between the dash and the front seat, thus causing a circulation of air within this space, whereby the warm air will be displaced by the cooler air entering through the ventilator opening. In the construction shown in the drawings, the board B, which forms the lower portion of the frame of the wind shield, is provided with openings $b\ b$. A deflector or shield C is suitably secured to the rear face of the board B above the openings $b$ and extends downwardly in rear of the openings $b$ so that the air entering through the openings $b$ is deflected downwardly by the deflector or shield into the foot space, as indicated by the arrows in Fig. 1. The ventilator openings $b$ extend practically the full width of the wind shield or dash, being thus large enough to afford thorough ventilation.

In order to vary the quantity of air which passes through the ventilating openings and thus regulate the ventilation as desired and to prevent the entrance of air when ventilation is not desired, means of any suitable construction are provided for partially or completely closing the ventilator openings $b$. Hinged dampers or shutters D are shown for this purpose which can be opened to the position shown by dotted lines in Fig. 4, in which position they assist the circulation of air into the body by deflecting downwardly into the openings $b$ some of the air which would otherwise strike above the openings, or which can be moved to completely or partially close the openings $b$. Any suitable mechanism for operating and adjusting the shutters may be used, that shown in Figs. 1-5 comprising a hand lever E which is rigidly secured to one end of a shaft or pin $e$ which is journaled in a bearing $e'$ secured to the board B between the openings $b$. One arm of this lever extends through an opening $e^2$ in the deflector C into a position to be easily reached by the occupant of the front seat, and the other arm of the lever is slidably connected at its end with one of the shutters D, for instance, by a transverse pin $e^3$ on the lever sliding in a slotted guide $e^4$ secured on the shutter. An arm $e^5$, rigidly secured to the other end of the shaft $e$, has a similar sliding connection with the other shutter D. If the upper end or handle of the lever E is pressed downwardly, the other arm thereof and the arm $e^5$ will move forwardly through the ventilator openings $b$ and move the shutters outwardly to open the ventilator openings.

F represents a toothed segment, preferably formed integrally with the bearing $e'$. A pin or part $f$ on the lever E is held in yielding engagement with the toothed segment by a spring $f'$. This spring surrounds the shaft $e$ within a cavity $f^2$ in the bearing $e'$, and bears at one end against the bearing and at the other end against the arm $e^5$, thus pressing the shaft $e$ in a direction to hold the pin $f$ in engagement with the toothed segment F. When the lever E is swung to open or close the shutters the pin $f$ will ride over the teeth of the segment and will retain the shutters in any position to which they are moved. Any other suitable means may be employed for holding the shutters or dampers in the desired position.

In Figs. 6 and 7 different means are shown for adjusting and operating the shutters, in which a screwthreaded shaft or stem G is provided which is pivoted to turn in a hole or bearing formed in a bracket $g$ which is rigidly secured to the deflector or other portion of the vehicle and is held from endwise movement in the hole. The lower end of the shaft G is provided with a hand wheel $g'$ or other suitable means whereby the operator can turn the shaft, and the upper threaded portion of the shaft engages in an internally threaded hole in a connecting rod $g^2$. The opposite ends of this rod are pivotally secured to the arms $h$ of two levers H, which are rigidly secured to the opposite ends of a shaft $h'$ journaled in a bearing $h^2$ secured to the board B. The other arms $h^3$ of the levers are slidably connected with the shutters to open and close the same. By turning the shaft G, the levers H can be swung in either direction so that the arms $h^3$ will open or close the shutters D, which will be held by the shaft in any position to which they are moved.

The ventilator has been described as comprising two openings with coöperating shutters or dampers, but it will be understood that one or any number of openings controlled by one or more shutters or dampers may be employed.

The device described thoroughly ventilates the inclosed foot space and prevents discomfort due to the heat from the engine.

The ventilator can be easily operated and adjusted from the inside of the car, but the operating mechanism and the means for retaining the shutters or dampers in the desired positions are concealed under the deflector, leaving only the end of the operating lever exposed to view, so that the ventilator in no way detracts from the appearance of the vehicle and no parts thereof are in the way of the occupants.

We claim as our invention:

1. The combination with a vehicle body having a dash, of a wind shield projecting above said dash and provided with a transparent pane, said wind shield having an opening through the lower portion thereof above said dash, an outwardly opening shutter on said wind shield which is adjustable to regulate the effective area of said opening, and a deflector on said wind shield in rear of said opening by which the current of air entering through said opening is directed downwardly into the vehicle body in rear of the dash, substantially as set forth.

2. The combination with a vehicle body closed at the sides and having a dash and a ventilator opening at the upper portion of the dash, of an outwardly opening shutter for said opening arranged to be adjusted to different positions, and a deflector arranged in rear of said opening by which the current of air entering through said opening is directed downwardly into the vehicle body in rear of the dash, substantially as set forth.

3. The combination with a vehicle body having a dash and provided adjacent to the upper portion thereof with a ventilator opening, of an outwardly opening shutter for said ventilator opening, and operating means for said shutter located at the inner side of said dash, said shutter being adjustable to a position in which it inclines inwardly toward one edge of said opening for directing air into the opening, substantially as set forth.

4. The combination with a vehicle body having a dash and provided adjacent to the upper portion thereof with a ventilator opening, of a shutter for said opening which is movable to a position in which it extends upwardly and forwardly from the upper edge of said opening for directing air into the opening, said shutter being adjustable to different positions, substantially as set forth.

5. The combination with a vehicle body having a dash and provided adjacent to the upper portion thereof with a ventilator opening, of a shutter for said opening which is hinged at the upper edge of said opening to swing outwardly and upwardly to an upwardly inclined position for directing air into said opening, a deflector located in rear of said opening by which the air entering through said opening is directed downwardly into the vehicle body, and operating means for said shutter, substantially as set forth.

6. A vehicle body closed at the sides and having a dash and provided adjacent to the upper portion of the dash with a ventilator opening, a shutter for said opening, a deflector arranged in rear of said opening by which the current of air entering through said opening is directed downwardly into the body in rear of the dash, and operating means for said shutter covered by said deflector, substantially as set forth.

7. A vehicle body provided with a ventilator opening, an outwardly-opening hinged shutter for said opening arranged at the outer side thereof, and an operating lever for said shutter pivoted at the inner side of said opening and extending to the outer side of said opening and having a sliding connection with said shutter, substantially as set forth.

8. A vehicle body provided with a ventilator opening, a hinged shutter for said opening arranged at the outer side thereof, and means for securing said shutter in adjusted position, comprising an operating lever for the shutter, which is pivoted at the inner side of said opening and one arm of which slidably engages said shutter, and an adjusting screw connected to the other arm of said lever whereby the shutter can be adjusted by turning said screw, substantially as set forth.

9. The combination with a vehicle body provided at its front with a ventilator opening, of a shutter for said opening which is adjustable to a position in which it extends upwardly and forwardly from the upper edge of said opening for directing air into the opening, hinge connections for said shutter, and adjusting means for said shutter which are independent of said hinge connections, substantially as set forth.

10. The combination with a vehicle body provided at its front with a ventilator opening, of a shutter for said opening which is adjustable to a position in which it extends upwardly and forwardly from the upper edge of said opening for directing air into the opening, and a deflector separate from said shutter in rear of said opening which extends downwardly from the upper edge of the opening for directing the air downwardly into the body, substantially as set forth.

Witness our hands, this 18th day of September, 1911.

DAVID FERGUSSON.
JAMES R. WAY.

Witnesses:
W. J. CREAMER,
WM. J. THOMPSON.